(12) United States Patent
Bhattacharjee et al.

(10) Patent No.: US 11,659,402 B2
(45) Date of Patent: May 23, 2023

(54) ENHANCED RESERVATION SIGNAL FOR CELLULAR COMMUNICATION IN UNLICENSED SPECTRUM

(71) Applicant: Apple Inc., Cupertino, CA (US)

(72) Inventors: Deepankar Bhattacharjee, Milpitas, CA (US); Prateek Sharma, San Jose, CA (US); Farouk Belghoul, Campbell, CA (US); Dawei Zhang, Saratoga, CA (US); Haitong Sun, Irvine, CA (US); Wei Zeng, San Diego, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 16/816,049

(22) Filed: Mar. 11, 2020

(65) Prior Publication Data

US 2020/0296593 A1   Sep. 17, 2020

Related U.S. Application Data

(60) Provisional application No. 62/819,044, filed on Mar. 15, 2019.

(51) Int. Cl.
*H04W 16/14* (2009.01)
*H04W 72/04* (2023.01)
(Continued)

(52) U.S. Cl.
CPC ....... *H04W 16/14* (2013.01); *H04W 72/0446* (2013.01); *H04W 74/0808* (2013.01); *H04W 84/12* (2013.01)

(58) Field of Classification Search
None
See application file for complete search history.

(56) References Cited

U.S. PATENT DOCUMENTS 9,986,586 B2   5/2018   Lee et al.
10,117,261 B2   10/2018   Liu et al.
(Continued)

FOREIGN PATENT DOCUMENTS

| CN | 107113885 | 8/2017 |
|---|---|---|
| CN | 107409401 | 11/2017 |
| CN | 107623919 | 1/2018 |

OTHER PUBLICATIONS

Office Action for CN Application for Invention No. 202010173107.1; dated Jan. 28, 2023.

*Primary Examiner* — Faruk Hamza
*Assistant Examiner* — Cassandra L Decker
(74) *Attorney, Agent, or Firm* — Kowert, Hood, Munyon, Rankin & Goetzel, P.C.

(57) ABSTRACT

This disclosure relates to providing a reservation signal for cellular communication in unlicensed spectrum. A cellular base station may perform a listen-before-talk procedure on an unlicensed frequency channel. The cellular base station may transmit a reservation signal on the unlicensed frequency channel after successfully performing the listen-before-talk procedure. The cellular base station may perform carrier sensing on the unlicensed frequency channel at least once during the duration of the reservation signal. The cellular base station may perform cellular communication on the unlicensed frequency channel after ceasing transmitting the reservation signal.

20 Claims, 13 Drawing Sheets

(51) Int. Cl.
*H04W 74/08* (2009.01)
*H04W 84/12* (2009.01)
*H04W 24/04* (2009.01)
*H04W 72/0446* (2023.01)

(56) References Cited

U.S. PATENT DOCUMENTS

| | | |
|---|---|---|
| 10,206,223 B2 | 2/2019 | Belghoul et al. |
| 10,313,075 B2 | 6/2019 | Yi et al. |
| 10,314,063 B2 | 6/2019 | Yoon et al. |
| 10,341,960 B2 | 7/2019 | Yerramalli et al. |
| 10,433,181 B2 | 10/2019 | Kwak et al. |
| 2015/0215101 A1* | 7/2015 | Tandai ............... H04W 24/08 370/252 |
| 2016/0142920 A1* | 5/2016 | Suzuki ............... H04W 72/14 370/336 |
| 2017/0111931 A1 | 4/2017 | Damnjanovic et al. |
| 2017/0231006 A1* | 8/2017 | Yin ............... H04W 72/0446 |
| 2017/0238341 A1* | 8/2017 | Liu ............... H04W 74/02 370/336 |
| 2017/0311322 A1* | 10/2017 | Kim ............... H04W 72/042 |
| 2018/0184446 A1* | 6/2018 | Chiang ............... H04W 72/1289 |
| 2018/0255577 A1* | 9/2018 | Lee ............... H04W 74/00 |
| 2018/0279366 A1 | 9/2018 | Harada et al. |
| 2019/0014596 A1* | 1/2019 | Yang ............... H04W 72/085 |
| 2019/0230706 A1* | 7/2019 | Li ............... H04W 88/08 |
| 2019/0342915 A1 | 11/2019 | Kim et al. |
| 2020/0295892 A1* | 9/2020 | Oh ............... H04W 74/006 |

* cited by examiner

ENHANCED RESERVATION SIGNAL FOR CELLULAR COMMUNICATION IN UNLICENSED SPECTRUM

PRIORITY INFORMATION

This application claims priority to U.S. provisional patent application Ser. No. 62/819,044, entitled "Enhanced Reservation Signal for Cellular Communication in Unlicensed Spectrum," filed Mar. 15, 2019, which is hereby incorporated by reference in its entirety as though fully and completely set forth herein.

FIELD

The present application relates to wireless communications, and more particularly to systems, apparatuses, and methods for providing a reservation signal for cellular communication in unlicensed spectrum.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (e.g., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

In addition to the communication standards mentioned above, there also exist extensions aimed at boosting transmission coverage in certain cellular networks. For example, LTE in Unlicensed spectrum (LTE-U) allows cellular carriers to boost coverage in their cellular networks by transmitting in the unlicensed 5 GHz band, which is also used by many Wi-Fi devices. Licensed Assisted Access (LAA) describes a similar technology aimed to standardize operation of LTE in the Wi-Fi bands through the use of a contention protocol referred to as listen-before-talk (LBT), which facilitates coexistence with other Wi-Fi devices on the same band. As another example, NR-U is a technology under development that is intended to provide support for performing 5G NR cellular communication in unlicensed spectrum. However, operating in unlicensed spectrum presents unique challenges, e.g., in comparison to operating in licensed spectrum. Accordingly, improvements in the field are desired.

SUMMARY

Embodiments are presented herein of apparatuses, systems, and methods for providing a reservation signal for cellular communication in unlicensed spectrum (e.g., LAA/LTE-U/NR-U communication).

According to the techniques described herein, a cellular base station may take a discontinous transmission approach to providing a reservation signal after successfully completing a LBT procedure and before performing cellular communication on an unlicensed frequency channel.

According to such an approach, at least one off-duration portion in which the reservation signal is not transmitted may be included in the duration of the reservation signal. In some embodiments, the full duration of the reservation signal may include alternating on-duration portions (in which the reservation signal is transmitted) and off-duration portions (in which the reservation signal is not transmitted). The cellular base station may use such off-duration portions to perform carrier sensing, e.g., to determine whether any interfering transmissions might be occurring.

If an interfering transmission is detected, the cellular base station may delay performing cellular communication until the interfering transmission is complete, and may correspondingly extend the duration of the reservation signal until the cellular communication begins.

Such an approach may reduce the impact of collisions, potentially both on the cellular communication (e.g., since the cellular base station may delay data communication until the collision is over) and on the other transmission (e.g., since use the off-duration portion(s) of the reservation signal may result in less interference to the transmission than a continuously transmitted reservation signal), at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
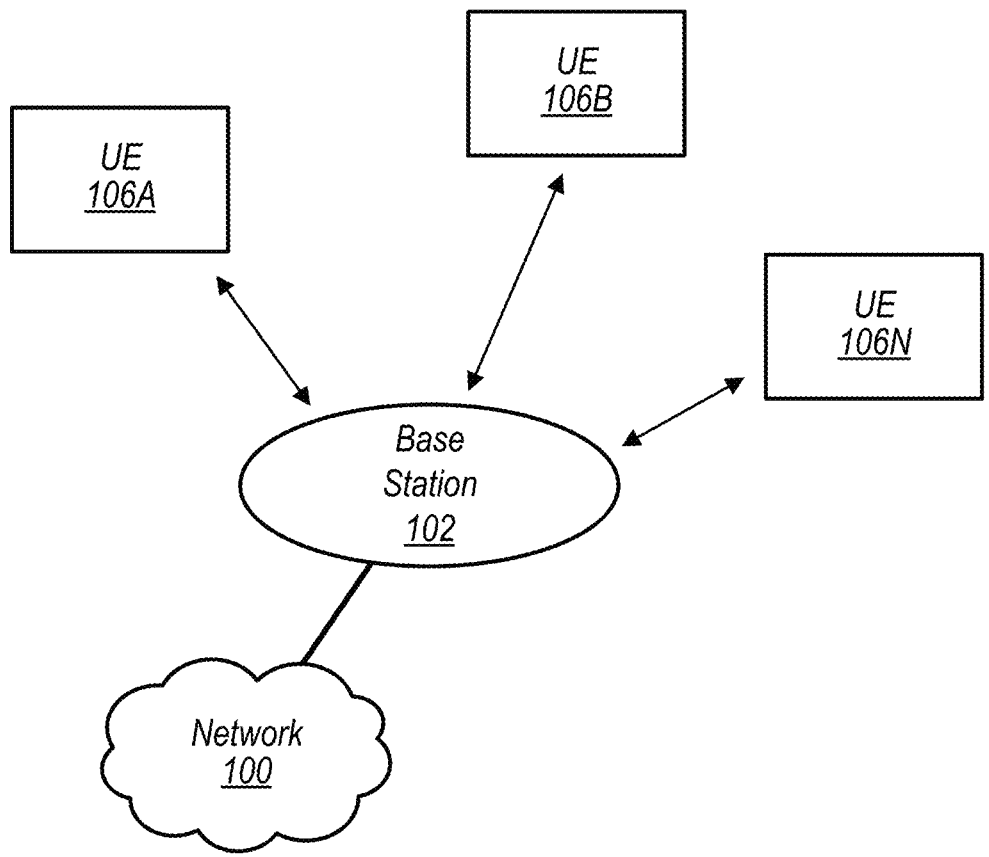
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
NR-U: NR-Unlicensed
LTE-U: LTE-Unlicensed
LAA: Licensed Assisted Access
TX: Transmission/Transmit
RX: Reception/Receive
LAN: Local Area Network
WLAN: Wireless LAN
LBT: Listen-Before-Talk
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
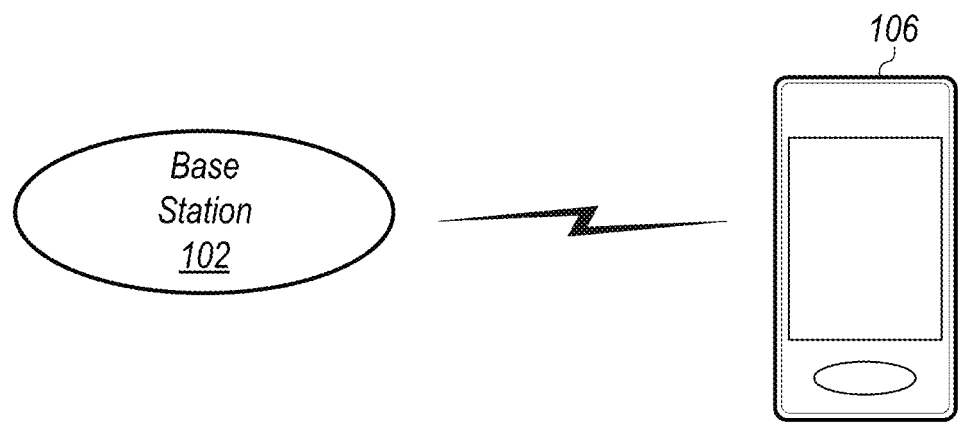
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB'. If the base station 102 is implemented in the context of NR, it may alternately be referred to as a 'gNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, NR, NR-U, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards. In some embodiments, the BS 102 may be configured to implement techniques for providing a reservation signal for cellular communication in unlicensed spectrum, at least according to the various methods as described herein.

Note that a UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM, or LTE or NR), and separate radios for communicating using each of Wi-Fi and BLUETOOTH™. Other configurations are also possible.

Figure 3:
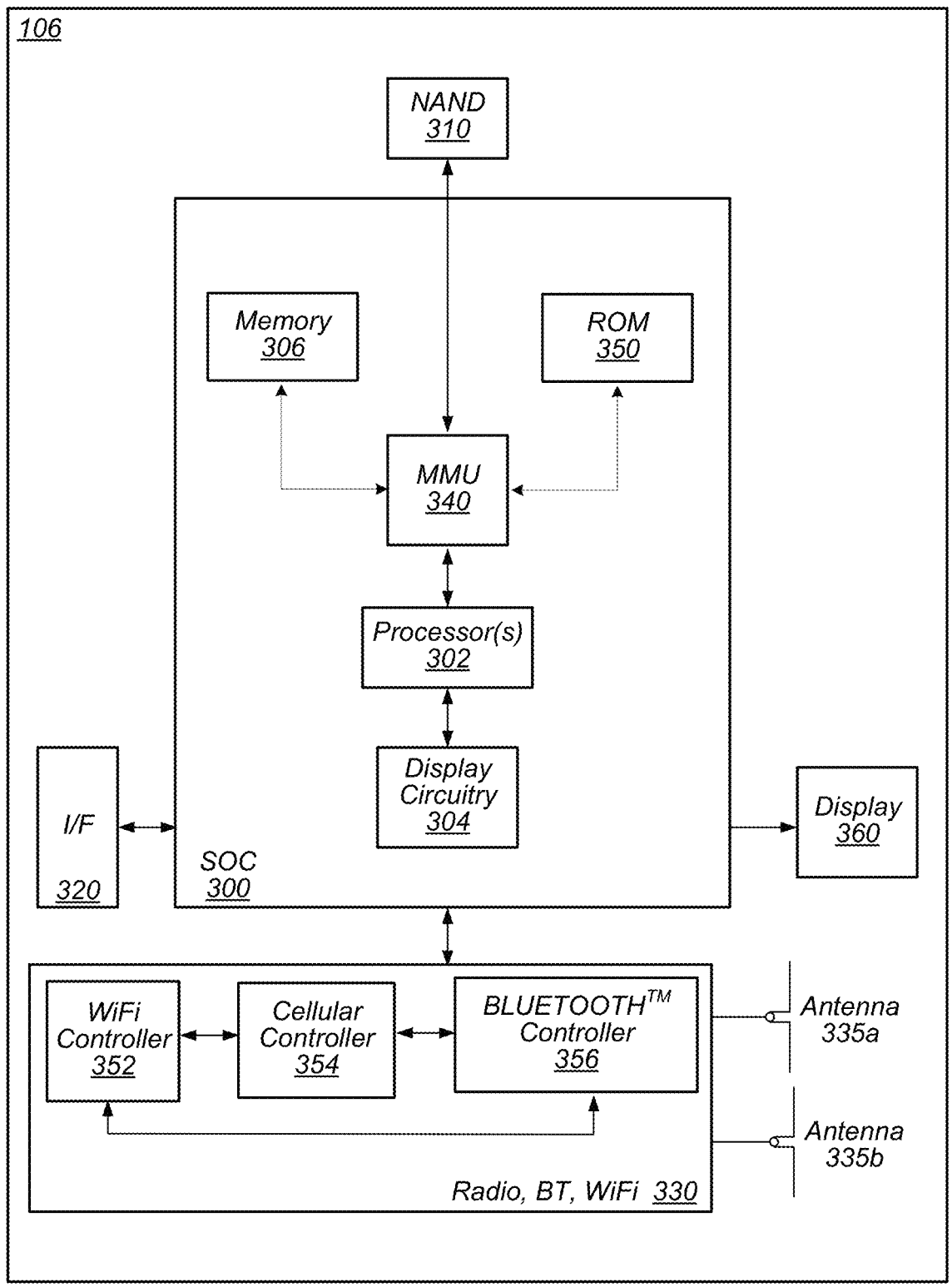
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, NFC, GPS, etc.).

The UE device 106 may include at least one antenna (e.g. 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for performing cellular communication in unlicensed spectrum utilizing a reservation signal such as described herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform cellular communication in unlicensed spectrum according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible LAA communication by the UE 106. As another possibility, the cellular controller 354 may include hardware and/or software components for generating Wi-Fi physical layer preamble signals, e.g., for transmitting as part of uplink communications by the UE 106 that occur in unlicensed frequency bands.

Figure 4:
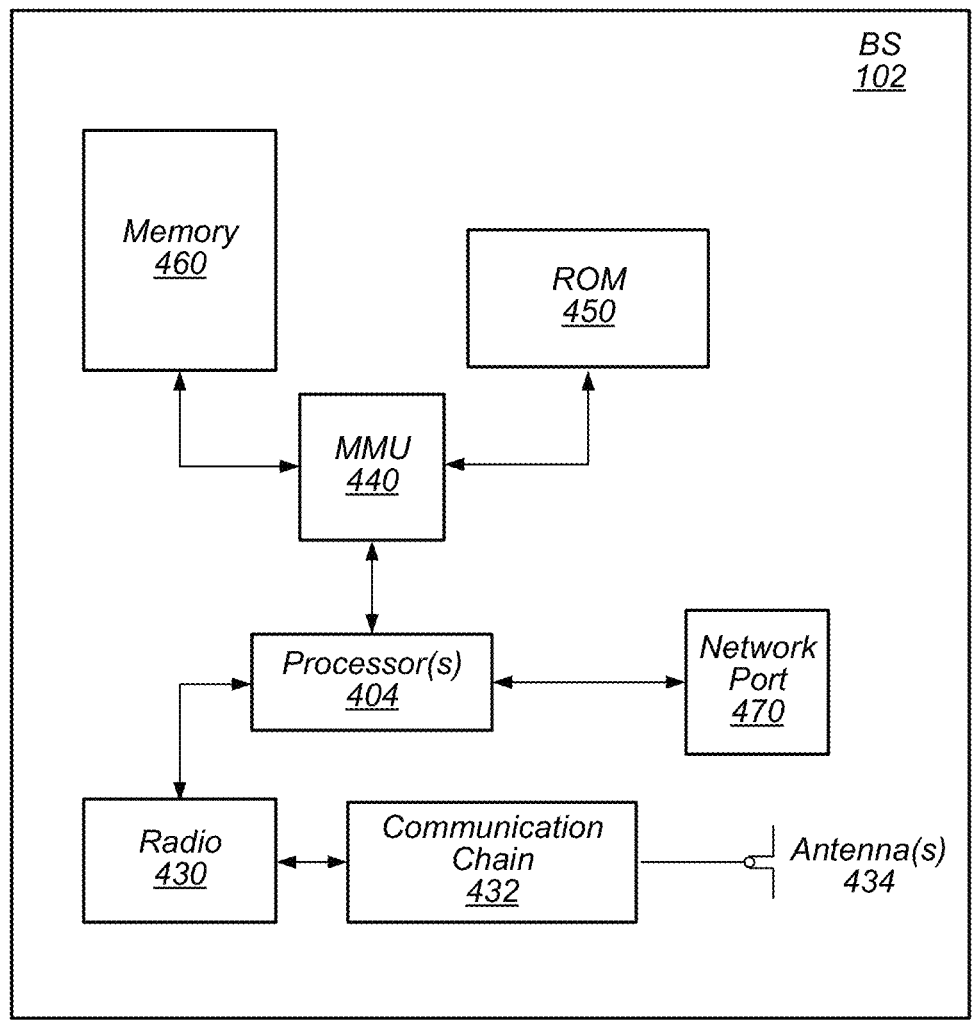
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, NR, NR-U, WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard. Base station 102 may operate according to the various methods as disclosed herein for providing a reservation signal for cellular communication in unlicensed spectrum.

Figure 5:
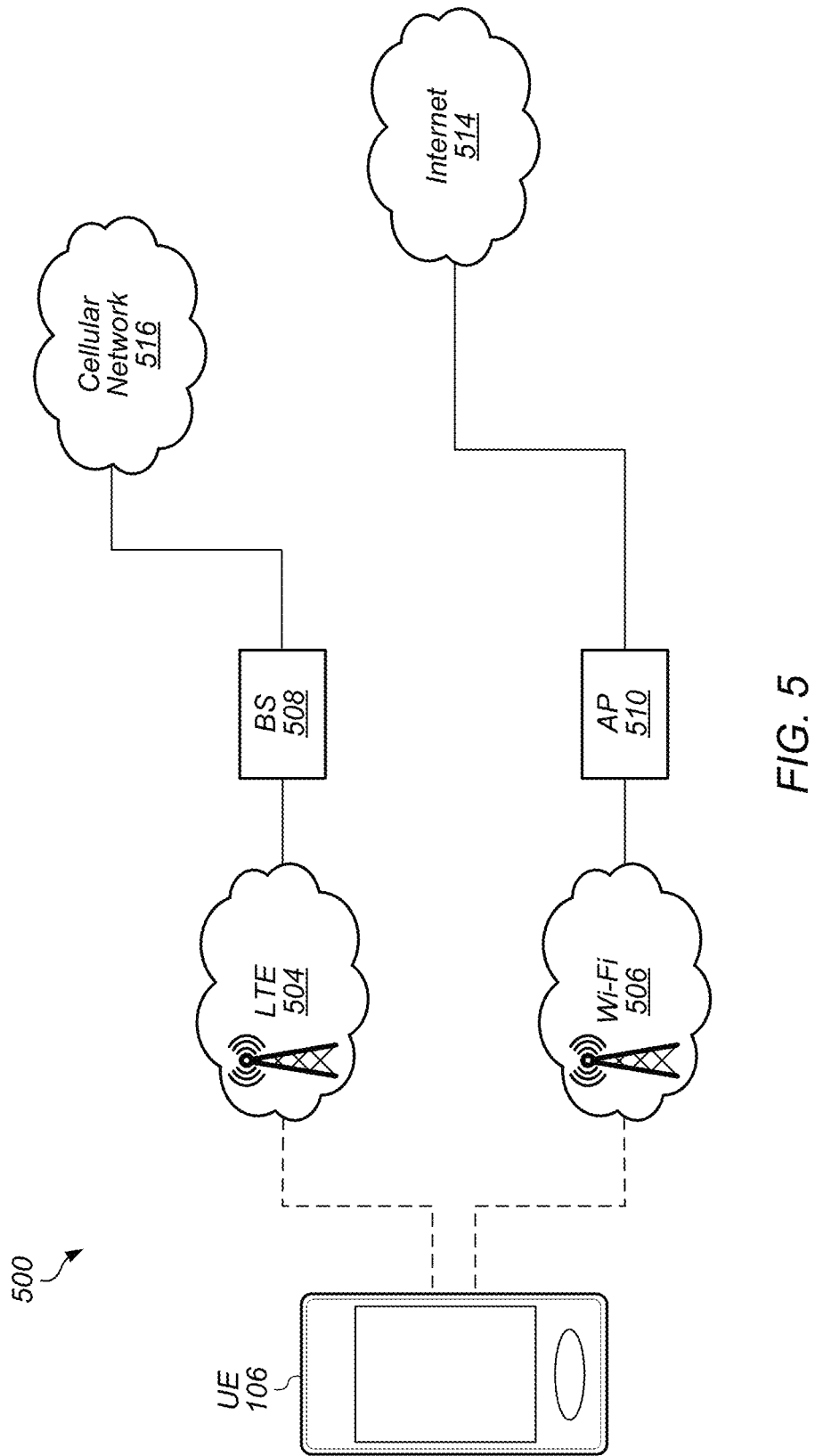
FIG. 5 illustrates an exemplary wireless communication system, according to some embodiments.

FIG. 5—Exemplary Communication System

FIG. 5 illustrates an exemplary wireless communication system 500 in which aspects of the present disclosure may be implemented, according to some embodiments. System 500 is a system in which an LTE access network and a Wi-Fi radio access network are implemented. It is noted that the system 500 of FIG. 5 is merely one example of a possible system, and embodiments may be implemented in any of various systems, as desired.

LTE access network 504 is representative of some embodiments of a first RAT access and Wi-Fi access network 506 is representative of some embodiments of a second RAT access. LTE access network 504 may be interfaced with a broader cellular network (e.g., LTE network) and Wi-Fi access network 506 may be interfaced with the Internet 514. More particularly, LTE access network 504 may be interfaced with a serving base station (BS) 508, which may in turn provide access to broader cellular network 516. The Wi-Fi access network 506 may be interfaced with an access point (AP), which may in turn provide access to the Internet 514. UE 106 may accordingly access Internet 514 via AP 510 and cellular network 516 via LTE access network 504. In some embodiments, though not shown, UE 106 may also access Internet 514 via LTE access network 504. More specifically, LTE access network 504 may be interfaced with a serving gateway, which may in turn be interfaced with a packet data network (PDN) gateway. The PDN gateway may, in turn, be interfaced with Internet 514. UE 106 may accordingly access Internet 514 via either or both of LTE access network 504 and Wi-Fi access network 506.

Figure 6:
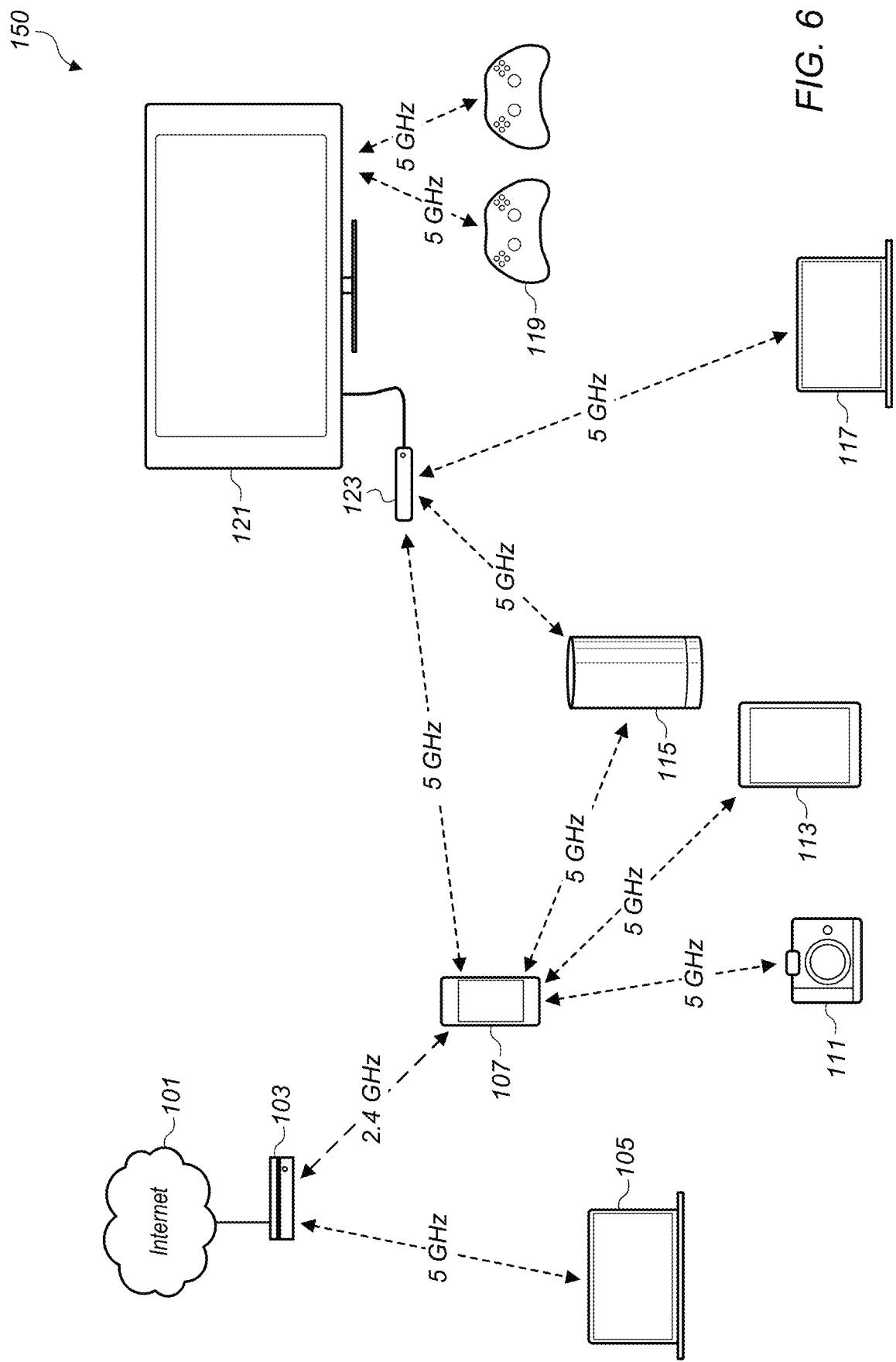
FIG. 6 illustrates an exemplary communication system in which multiple different devices may communicate with each other over specific band, such as 2.4 GHz and/or 5 GHz frequency bands using Wi-Fi, according to some embodiments.

FIG. 6—Exemplary Communication System with Multiple Wi-Fi Devices

FIG. 6 shows an exemplary communication system in which multiple different devices may communicate with each other over a specific band, such as 2.4 GHz and/or 5 GHz frequency bands using Wi-Fi RAT. It is noted that the system of FIG. 6 is merely one example of a possible system, and embodiments may be implemented in any of various systems, as desired.

5 GHz Wi-Fi (e.g., IEEE 802.11 ac/n) capable devices have become quite common, operating in both peer-to-peer mode and/or infrastructure/station mode, as shown in FIG. 6. Data communications over a specific frequency band, e.g., over the 5 GHz band, may include Voice, Video, real time and best effort type of traffic. Illustrated devices include cameras (111), tablets (113), speakers (115), portable computers (105, 117), access ports/routers (103), game controllers (119), mobile devices such as smart phones (107), and smart monitors (121) or monitors with wireless access interface (121 together with media processing devices 123). As shown in FIG. 6, many of the devices may communicate over the 5 GHz band, using Wi-Fi communication technology. In some cases the Wi-Fi communications conducted by the devices may affect and/or be affected by LAA/LTE-U communications and/or other cellular communications also taking place over the 5 GHz band.

Figure 7:
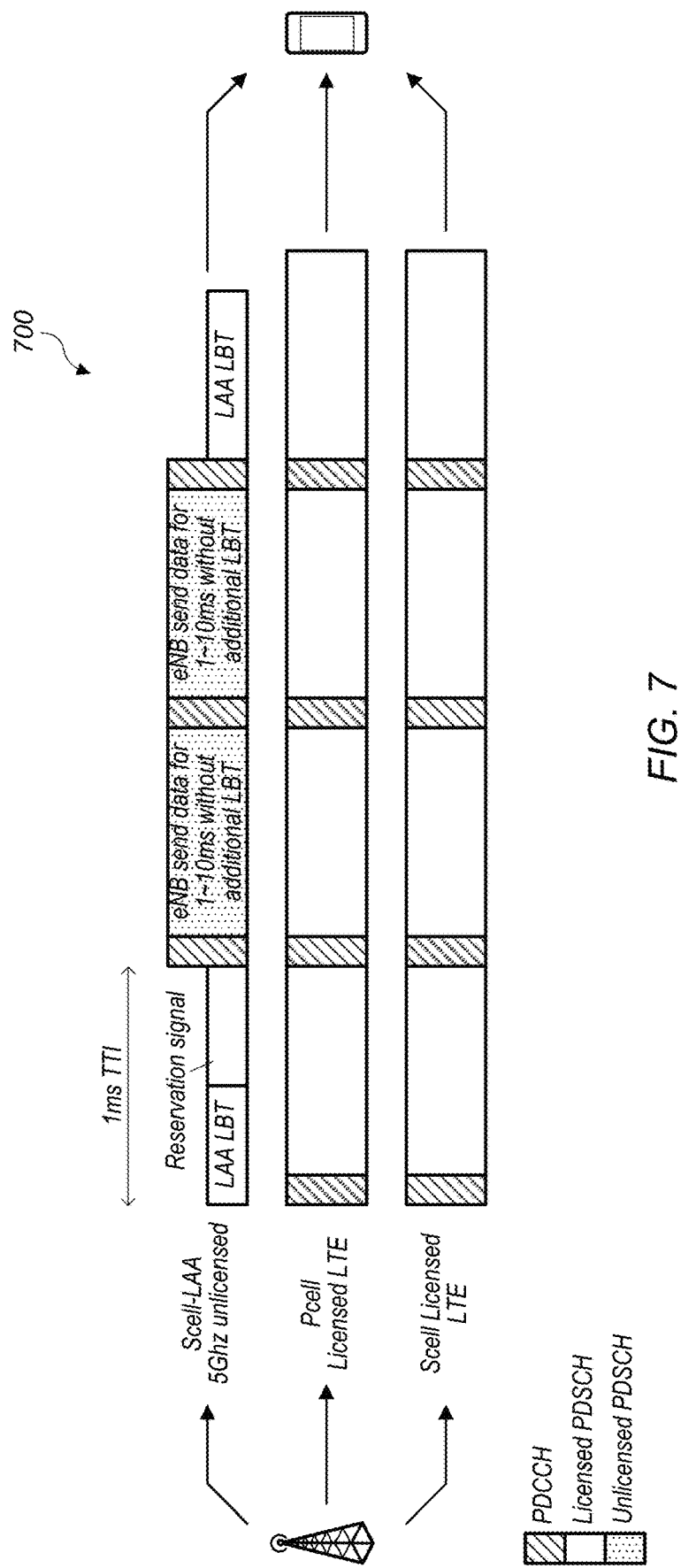
FIGS. 7-8 illustrate exemplary aspects of LAA communication, according to some embodiments.
Figure 8:
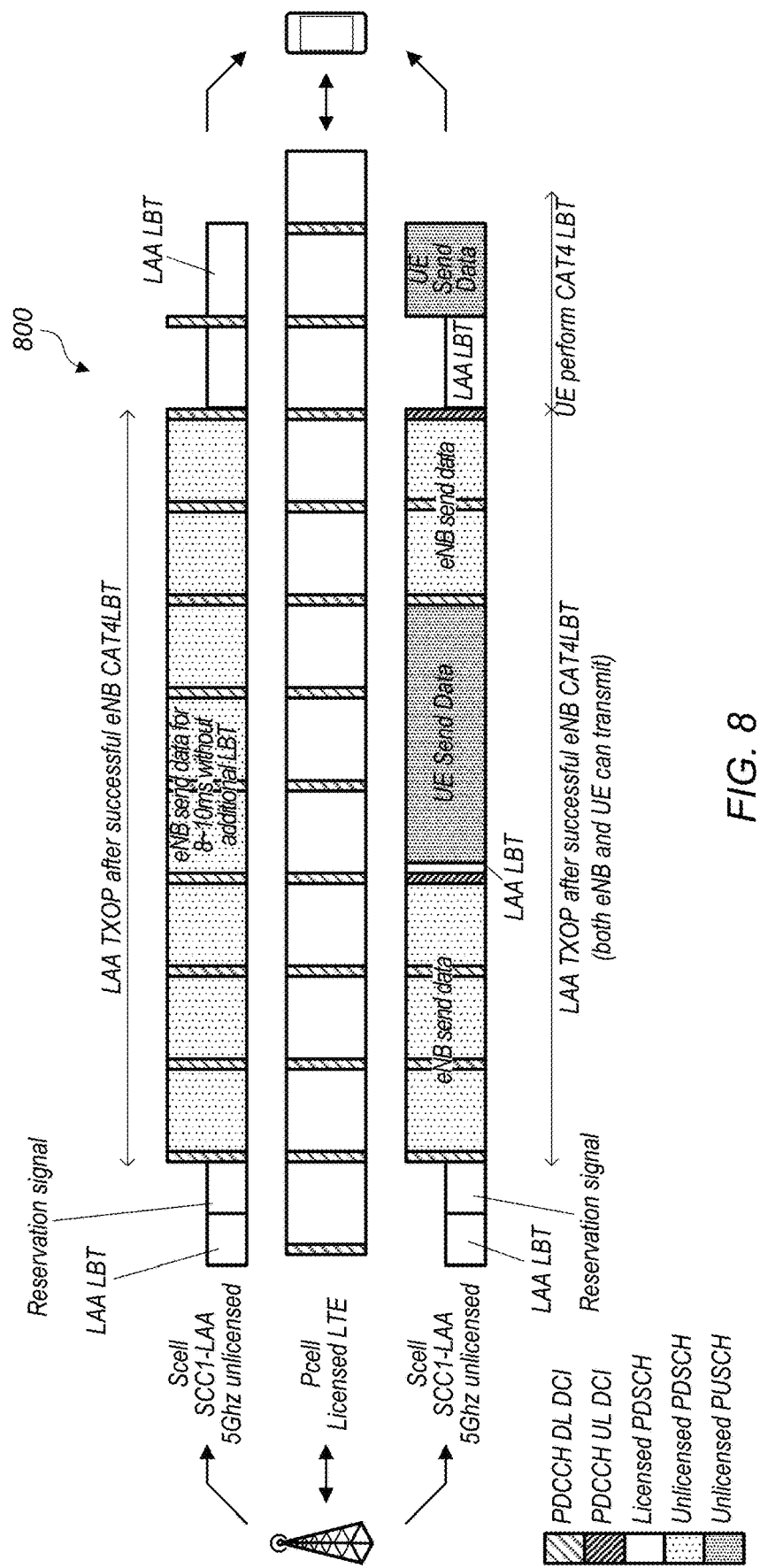

FIGS. 7-8—LAA Structure Summary

In LTE, carrier aggregation (CA) may refer to two or more component carriers (CCs) being aggregated in order to support wider transmission bandwidths, e.g., bandwidths of up to 100 MHz. A UE may simultaneously receive or transmit on one or multiple CCs depending on the UE's capabilities. When CA is configured, the UE may maintain one RRC connection with the network. The serving cell managing the UE's RRC connection is referred to as the Primary Cell (Pcell), and Secondary Cells (Scells) together with the PCell may form a set of serving cells. In CA, a UE may be scheduled via the physical downlink control channel (PDCCH) over multiple serving cells simultaneously. Cross-carrier scheduling, e.g., using a Carrier Indicator Field (CIF), may allow the PDCCH of a serving cell to schedule resources on another serving cell. That is, a UE receiving a downlink assignment on one CC may receive associated data on another CC.

LAA may include a sub-category of LTE inter-band carrier aggregation, in which one of the secondary carriers is operating in a 5 GHz unlicensed band, a band over which communications according to another RAT, such as Wi-Fi, may also be taking place. Resources in an LAA carrier may be scheduled in the same manner that resources are scheduled in legacy CA. That is, same carrier scheduling and/or cross-carrier scheduling may be used for scheduling LAA carriers, e.g., using the PDCCH or ePDCCH. An LAA Scell may operate in a frame structure 3 composed of 20 slots and may be accessed following a successful listen-before-talk (LBT) procedure, as one possibility.

Note that (e.g., depending on the applicable standard version and/or implementation choices), LAA may be used for downlink communication and/or uplink communication. For example, according to some embodiments, LAA release 13 may include standard specification details for using a SCell for downlink transmissions, while LAA release 14 may include standard specification details for using a SCell for both downlink and uplink transmissions. Other versions having similar or different supported features are also possible.

FIG. 7 shows an example of possible LAA control and data scheduling in an example Release 13 scenario 700. As shown, an eNB may communicate with a wireless device using three CCs in the example scenario of FIG. 7. The CCs may include a Pcell and one Scell that operate in licensed LTE spectrum, as well as one LAA Scell that operates in unlicensed 5 GHz spectrum. The eNB may make use of an LBT procedure and (e.g., if needed) a reservation signal prior to performing 1-10 μs of communication on the LAA Scell. A further LBT procedure may again be performed prior to performing additional downlink communication on the LAA Scell.

FIG. 8 shows an example of possible LAA control and data scheduling in an example Release 14 scenario 800. As shown, an eNB may also communicate with a wireless device using three CCs in the example scenario of FIG. 8. The CCs may in this example include a Pcell that operates in licensed LTE spectrum and two Scells that operate in unlicensed 5 GHz spectrum. The eNB may make use of an LBT procedure and (e.g., if needed) a reservation signal prior to performing 1-10 μs of communication on each of the LAA Scells. The eNB may be able to provide some portion of the LAA Scell resources for uplink transmit opportunities. For example, as shown, the eNB may provide an indication of an uplink transmit opportunity (TXOP) to the wireless device during its reserved LAA TXOP via downlink control information (DCI) sent on the PDCCH, based on which the wireless device may perform its own LBT procedure and send uplink data on the LAA Scell.

FIG. 9—Flowchart

Providing coexistence features for cellular communication in unlicensed spectrum may be useful to improve quality of service obtained by wireless devices performing cellular, Wi-Fi, and/or other forms of communication in unlicensed spectrum, and/or may help improve cell capacity for carriers utilizing unlicensed spectrum. For example, the use of listen-before-talk (LBT) and other such collision avoidance techniques may substantially reduce the likelihood of collisions on a wireless medium. However, at least in some instances, it may still be possible for collisions to occur, e.g., even if all parties on the medium are contending for medium access using clear channel assessment and LBT procedures. For example, if multiple devices complete their LBT procedures in sufficiently close temporal proximity, both may begin transmitting without realizing that another transmission is simultaneously occurring. In this case the transmissions may cause interference to each other, which could potentially result in receivers being unable to receive and/or decode one or both transmissions.

In the case of cellular use of unlicensed spectrum, it may be the case that data communication is constrained to begin at cellular slot boundaries, or possibly at one or more cellular slot subdivisions (e.g., half-slot, quarter-slot, etc.), which may not necessarily be synchronized with when the medium becomes available. Accordingly, as previously noted herein, in some instances a cellular base station that has successfully performed a LBT procedure may transmit a reservation signal to reserve the medium (e.g., to prevent other devices performing carrier sensing from determining that the medium is available) until the next available cellular slot (or half-slot, quarter-slot, etc.).

One possible approach to transmitting the reservation signal may include transmitting a signal continuously from successful LBT completion until the next opportunity to begin cellular data transmission/reception. However, if a collision were to occur when such an approach is used, there could be interference to the data transmission/reception. Alternatively, it may be possible to discontinuously transmit the reservation signal, potentially leaving opportunity to perform carrier sensing/energy sensing between transmitting the reservation signal. This may allow a cellular device (e.g., a cellular base station) to detect when a collision is occurring, and correspondingly take action to avoid interference to its cellular transmission/reception activities.

Figure 9:
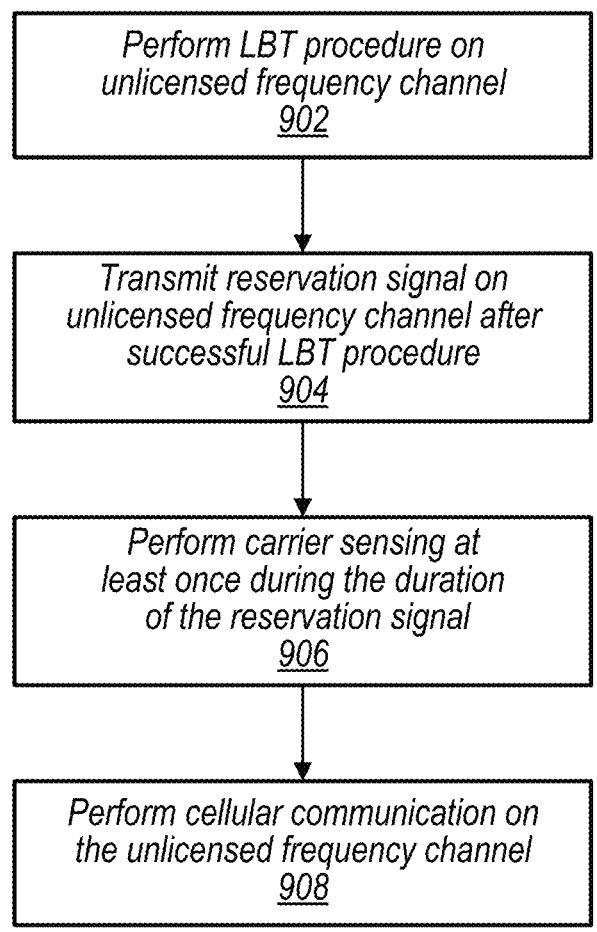
FIG. 9 is a flowchart diagram illustrating aspects of an exemplary possible method for providing a reservation signal for cellular communication in unlicensed spectrum, according to some embodiments.

Accordingly, FIG. 9 illustrates aspects of a possible method for providing a discontinuous reservation signal for cellular communication in unlicensed spectrum, which may be used in conjunction with the various aspects of this disclosure, and/or which may be used in any number of other contexts, as desired.

Aspects of the method of FIG. 9 may be implemented by a wireless device and a cellular base station, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. Note that while at least some elements of the method of FIG. 9 are described in a manner relating to the use of communication techniques and/or features associated with LTE, LTE-A, and/or 3GPP specification documents, such description is not intended to be limiting to the disclosure, and aspects of the method of FIG. 9 may be used in any suitable wireless communication system, as desired. In various embodiments, some of the elements of the methods shown may be performed concurrently, in a different order than shown, may be substituted for by other method elements, or may be omitted. Additional method elements may also be performed as desired.

As shown, the method of FIG. 9 may operate as follows. In 902, a BS may perform an LBT procedure on an unlicensed frequency channel. The BS may be capable of performing cellular communication with UEs in both licensed and unlicensed frequency bands. For example, at least according to some embodiments, the BS may provide at least one cell (e.g., a primarily cell or PCell) in a licensed frequency band and at least one cell (e.g., a secondary cell or SCell) in an unlicensed frequency band. For example, the BS may utilize a carrier aggregation scheme in which an LTE carrier (e.g., deployed in a licensed frequency band) is used as a primary component carrier and an LAA carrier (e.g., deployed in an unlicensed frequency band, such as the 5 GHz ISM band) is used as a secondary component carrier. The BS may thus be able to schedule data communications between the BS and UEs served by the BS as the BS deems appropriate, e.g., in view of load, channel conditions, uplink and/or downlink buffer status of the wireless device and/or other devices served by the BS, and/or any of various other possible considerations.

The LBT procedure may include performing carrier sensing (which may also be referred to as energy sensing) to monitor the unlicensed frequency channel for availability and counting down a randomly selected backoff counter value in each Wi-Fi slot that the medium is available after an initial defer period, according to some embodiments. If the medium becomes unavailable (e.g., due to another device transmitting on the medium) before the LBT procedure is complete, the BS may pause the LBT procedure, and resume counting down the backoff counter value after the medium is available for at least another defer period. Once the backoff counter value reaches 0, the LBT procedure may be considered to have been successfully completed. Note that while the preceding example may represent one possible LBT procedure, variations and alternative LBT procedures are also possible.

In 904, the BS may transmit a reservation signal on the unlicensed frequency channel after successfully completing the LBT procedure. The reservation signal may be transmitted discontinuously, e.g., such that there is at least one (and possibly multiple) off-duration(s) within the duration of the reservation signal. In some embodiments, part or possibly the full duration of the reservation signal may include alternating on-duration portions (e.g., in which the reservation signal is transmitted) and off-duration portions (e.g., in which the reservation signal is not transmitted). The lengths of the on-duration and off-duration portions may be selected from a variety of possible lengths. At least according to some embodiments, though, it may be preferable to configure each on-duration portion with a duration sufficiently long to block access to the unlicensed frequency channel by wireless devices performing energy sensing on the unlicensed frequency channel. For example, a length of at least one Wi-Fi slot (e.g., greater than 9 μs) may be selected, as one possibility. Similarly, it may be preferable to configure each off-duration portion to be sufficiently short to avoid allowing access to the unlicensed frequency channel by wireless devices performing energy sensing on the unlicensed frequency channel. For example, a length of at most one Wi-Fi slot (e.g., less than 9 μs) may be selected, as one possibility. This may help preserve the functionality of the reservation signal to reserve the medium for the BS.

In 906, the BS may perform carrier sensing at least once during the duration of the reservation signal (e.g., after determining that the LBT procedure is successful and before performing cellular data communication on the unlicensed frequency channel). The carrier sensing may be performed during one or more off-duration portions of the reservation signal, for example. Based on the carrier sensing, the BS may be able to determine whether there is an interfering transmission on the on the unlicensed frequency channel.

In 908, the BS may perform cellular communication on the unlicensed frequency channel. The BS may select a time at which to perform the cellular communication on the unlicensed frequency channel based at least in part on the carrier sensing performed during the duration of the reservation signal, at least according to some embodiments. For example, if the BS determines that there is no interfering transmission on the unlicensed frequency channel based on the carrier sensing, the BS may select the next time permissible according to the cellular timing synchronization scheme (e.g., cellular slot boundary, cellular half-slot boundary, cellular quarter-slot boundary, etc.) at which to perform the cellular communication on the unlicensed frequency channel. If the BS determines that there is an interfering transmission on the unlicensed frequency channel based on the carrier sensing (e.g., if energy above an energy threshold is detected), the BS may delay performing the cellular communication and extend the duration of the reservation signal. In this case, the BS may perform further carrier sensing at least until energy below the energy threshold is detected on the unlicensed frequency channel, and may select the next time permissible according to the cellular timing synchronization scheme after there is no interfering transmission on the unlicensed frequency channel at which to perform the cellular communication, and may extend the reservation signal until this selected time. Thus, at least according to some embodiments, the duration of the reservation signal may extend from determining that the LBT procedure on the unlicensed frequency channel is successful until performing the cellular communication on the unlicensed frequency channel.

Note that it may in some instances be possible that the interfering transmission includes another cellular transmission on the unlicensed frequency channel that utilizes a similar reservation signal approach, e.g., such that it could conceivably occur that each would transmit their reservation signal until the end of the transmit opportunity (TXOP) of one of the transmitters. At least in some instances, this may be considered an acceptable potential cost. Alternatively, if desired, a limit to the number of cellular slots (or another type of limit on the duration) of the reservation signal may be implemented, e.g., such that if the configured limit is reached and there is still an interfering transmission, the cellular base station may determine to cease transmitting and release the medium.

Thus, by monitoring the wireless medium at least once over the duration of the reservation signal, a BS may be able to determine whether there is a collision between the reservation signal and another transmission, and thereby to avoid beginning a cellular communication while there would be interference present. Further, at least according to some embodiments, if a discontinuous transmission approach is taken to providing the reservation signal, the impact to the other wireless device performing the colliding transmission may be reduced, e.g., as at least during the off-durations of the reservation signal the possible interference caused by the BS to the other transmission may be reduced. Additionally, the BS may benefit from potentially reduced power consumption needed to transmit the reservation signal using such a discontinous transmission approach, e.g., relative to a continuous transmission approach.

FIGS. 10-16—Additional Information

FIGS. 10-16 and the following information are provided as being illustrative of further considerations and possible implementation details relating to the method of FIG. 9, and are not intended to be limiting to the disclosure as a whole. In particular, FIGS. 10-16 may be illustrative of various possible coexistence considerations relating to 3GPP based communication systems in which LAA can be used to provide one or more cellular carriers on an unlicensed frequency band such as the 5 GHz ISM band. Numerous variations and alternatives to the details provided herein below are possible and should be considered within the scope of the disclosure.

Figure 10:
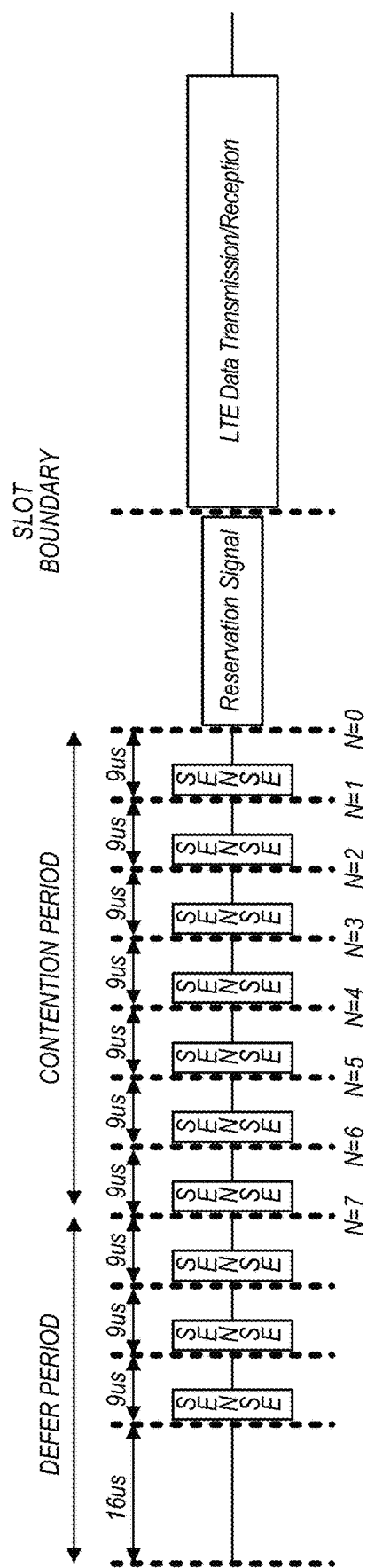
FIGS. 10-12 are timing diagrams illustrating exemplary aspects of an exemplary LBT procedure and LAA reservation signal approach in accordance with various possible medium use scenarios.

As previously noted herein, a cellular base station intending to perform cellular communication on an unlicensed frequency channel may perform a LBT procedure, and may possibly also transmit a reservation signal, prior to actually performing the cellular communication, at least according to some embodiments. FIG. 10 is a timing diagram illustrating aspects of such a process, as it might be performed in the absence of any other devices contending for the medium.

As shown, the cellular base station may initially wait for a 'defer' period after determining that the medium is available. In the illustrated example scenario, such a period may last for 43 μs (e.g., 16 μs+3*9 μs), though other lengths of time are also possible (e.g., for different priority levels or for any of various other reasons). After the defer period, if the medium is still available, the cellular base station may begin a contention period, in which the cellular base station may randomly (or pseudorandomly) select a contention window value within a specified range (which may similarly depend on priority level and/or any of various other considerations). In the illustrated example scenario, the contention window may be 7 Wi-Fi slots. During each Wi-Fi slot of the contention window, the cellular base station may perform carrier sensing to determine if the medium is still available. If it is determined that the medium is still available, the backoff counter may be reduced by one and the process may continue in the next Wi-Fi slot. Once the backoff counter reaches 0, the cellular base station may begin transmitting a reservation signal on the medium. The reservation signal may be transmitted until the next cellular slot boundary, at which time the cellular base station may perform cellular communication on the unlicensed frequency channel, such as LTE LAA data transfer with one or more UE devices.

Figure 11:
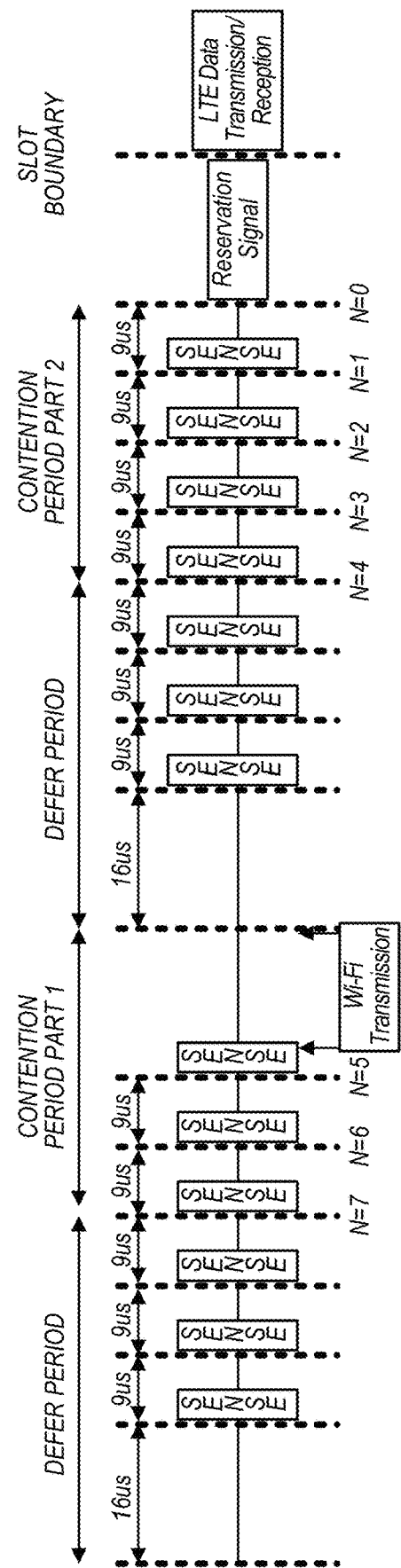

FIG. 11 is a timing diagram illustrating further aspects of a LBT process such as might be performed by a cellular base station operating on an unlicensed frequency channel, including when a Wi-Fi device is also contending for the medium. As shown, the cellular base station may initially wait for a defer period after determining that the medium is available, e.g., similar to the example scenario illustrated in FIG. 10. After the defer period, if the medium is still available, the cellular base station may begin the contention period, which is again shown as 7 Wi-Fi slots in the illustrated example scenario. However, in the scenario of FIG. 11, the carrier sensing to determine if the medium is still available may result in detection of a Wi-Fi transmission during the contention period. Accordingly, the cellular base station may wait until the medium becomes available again (e.g., after the Wi-Fi transmission is complete) for at least the specified defer period before resuming counting down the backoff counter. Eventually the backoff counter may reach 0, at which point the cellular base station may transmit a reservation signal until the next cellular slot boundary, then perform cellular communication on the medium.

Figure 12:
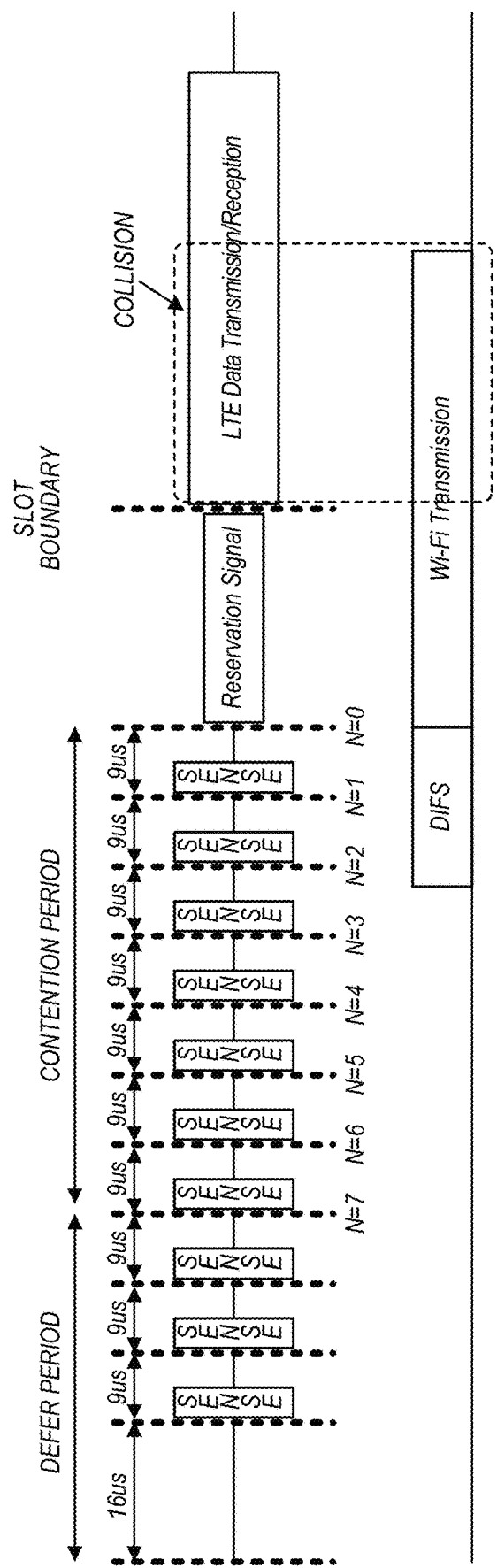

FIG. 12 is a timing diagram illustrating aspects of a scenario in which a collision could occur between a Wi-Fi device and a cellular base station even though the cellular base station performs a LBT procedure, according to some embodiments. As shown, the cellular base station may initially wait for a defer period after determining that the medium is available, and may count down its backoff counter to 0 without detecting any other transmissions on the medium, e.g., similar to the example scenario illustrated in FIG. 10. However, at some point between performing carrier sensing during the last Wi-Fi slot of the contention window and beginning to transmit the reservation signal, a Wi-Fi device may also finish its contention window and may begin a Wi-Fi transmission on the medium. This transmission may result in a collision with the cellular communication performed by the cellular base station, such as shown in the illustrated example.

Figure 13:
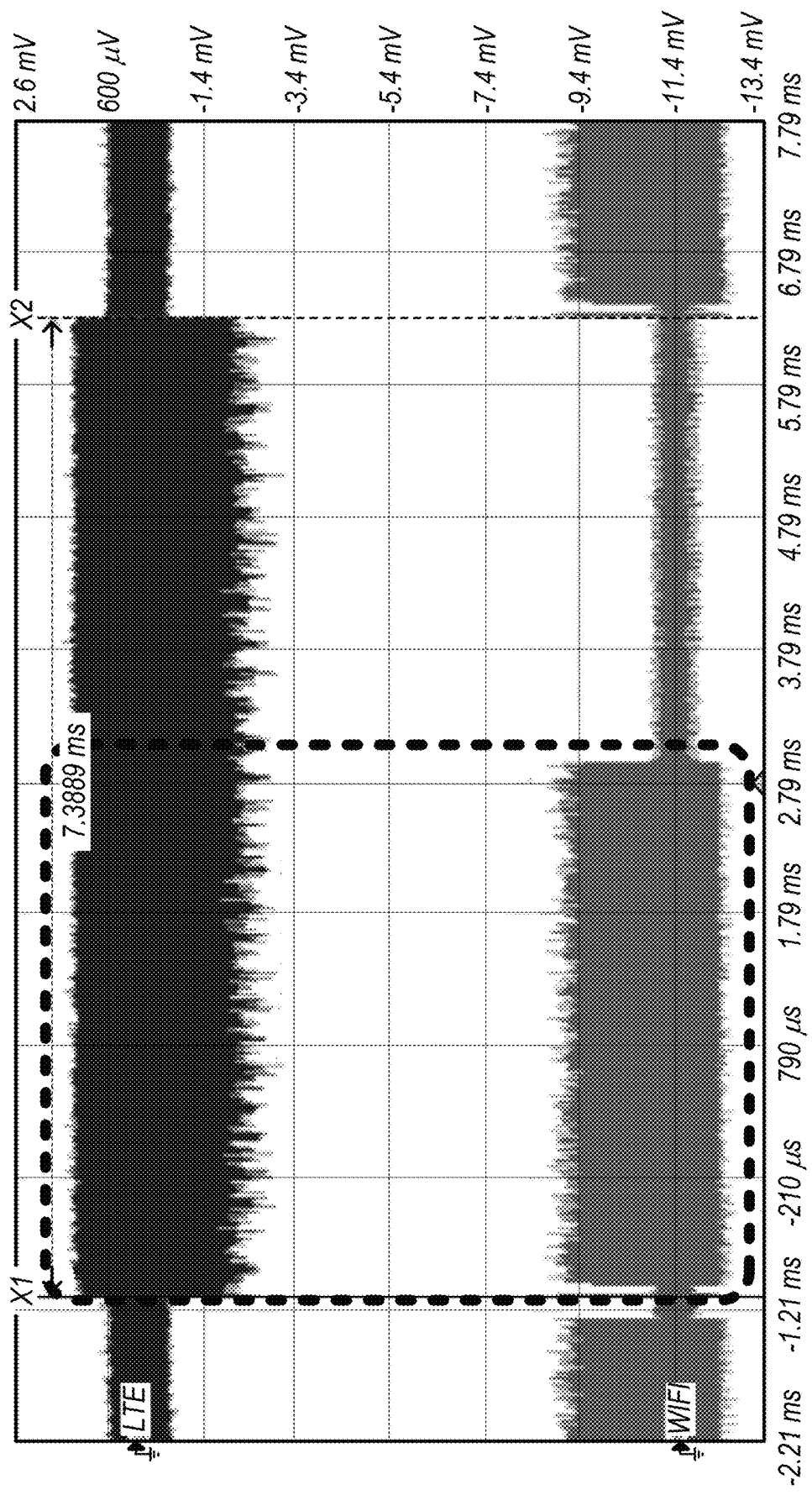
FIG. 13 illustrates aspects of an exemplary possible LAA—Wi-Fi collision.
Figure 14:
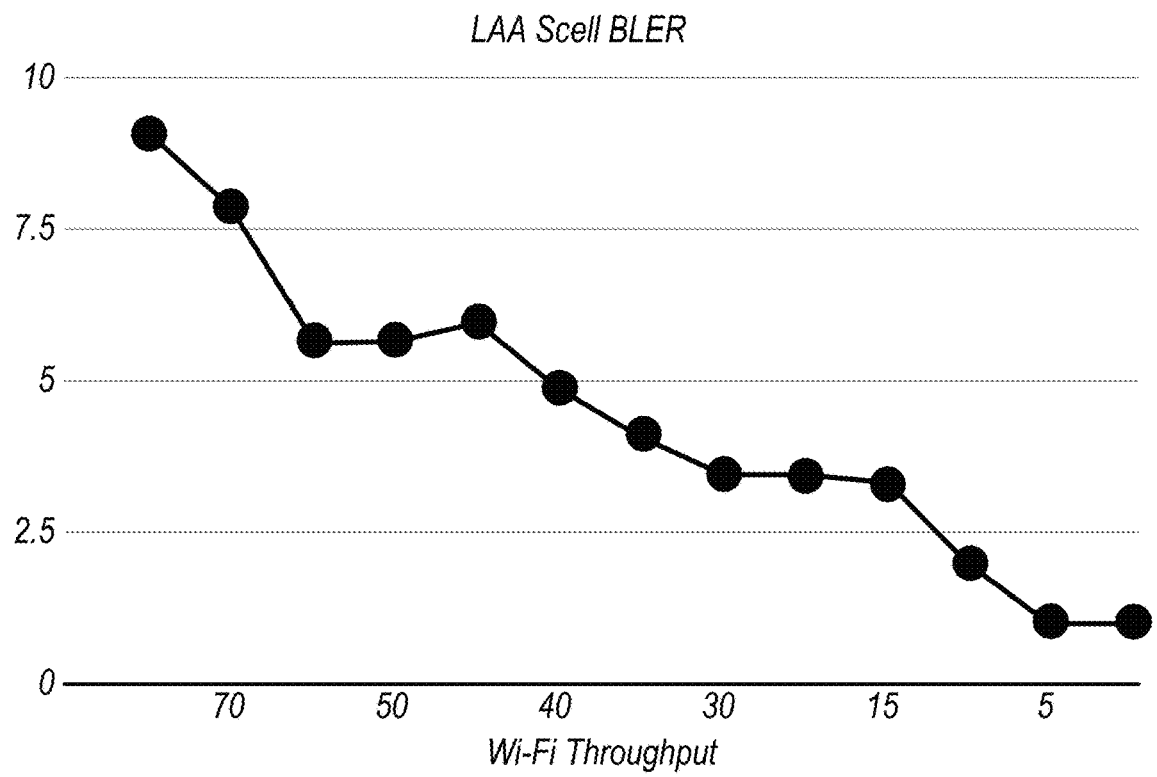
FIG. 14 is an exemplary LAA block error rate versus Wi-Fi throughput graph in accordance with one possible LAA reservation signal approach.
Figure 15:
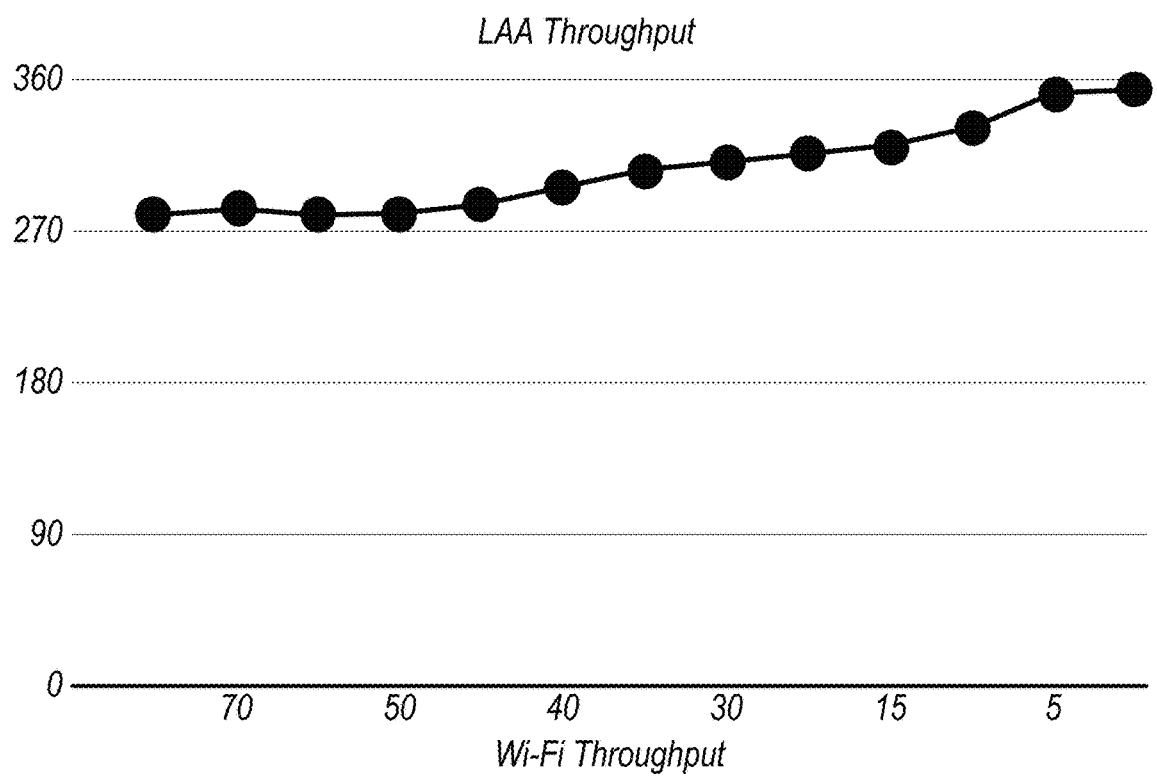
FIG. 15 is an exemplary LAA throughput versus Wi-Fi throughput graph in accordance with one possible LAA reservation signal approach.

Thus, in some instances it may be possible that collisions between Wi-Fi and cellular (such as LAA) communication in unlicensed spectrum can still occur, even if each device is using LBT and/or clear channel assessment (CCA) collision avoidance techniques. FIG. 13 illustrates a possible measurement result illustrating such a collision between LTE and Wi-Fi signals, e.g., such as may be obtained using an oscilloscope to monitor a frequency channel for real-time collision occurrences. FIG. 14 is an LAA block error rate versus Wi-Fi throughput graph obtained from an exemplary test scenario, which shows that LAA block error rate may generally increase, e.g., from approximately 1-9%, with Wi-Fi throughput increasing from 1-75 Mbps. Such an increased LAA block error rate may, for example, result at least in part from an increased likelihood of collisions as Wi-Fi traffic increases. Similarly, FIG. 15 is an LAA throughput versus Wi-Fi throughput graph obtained from an exemplary test scenario, which shows that LAA throughput may generally decrease, e.g., up to 10%, with Wi-Fi throughput increasing from 1-75 Mbps. Likewise, such a decreased LAA throughput may, for example, result at least in part from an increased likelihood of collisions as Wi-Fi traffic increases. This may represent systematic degredation in LAA performance which can result from collision scenarios such as may occur in co-existence cases.

Figure 16:
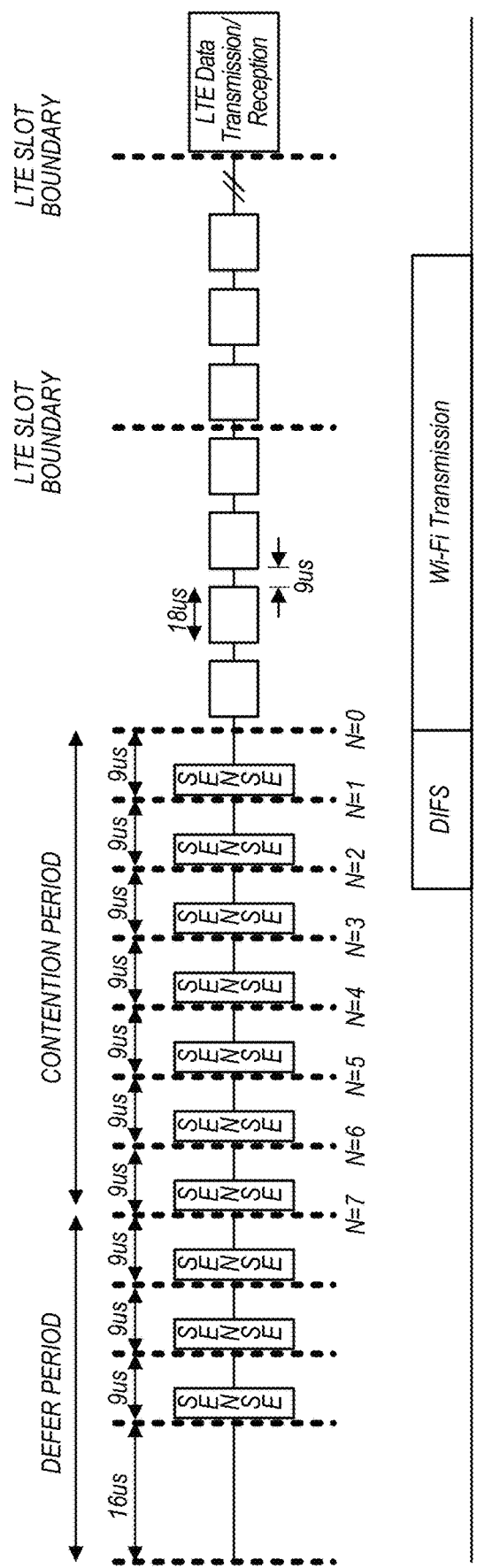
FIG. 16 is a timing diagrams illustrating exemplary aspects of an exemplary LBT procedure and an alternative LAA reservation signal approach in a possible medium use scenario.

It may, however, be possible to at least partially mitigate such collision induced performance degradation to LAA by using a modified approach to transmitting the reservation signal. FIG. 16 is a timing diagram illustrating aspects of a scenario in which such a modified approach is used. As shown, similar to FIG. 12, a cellular base station may perform a LBT procedure, monitoring an unlicensed frequency channel for a defer period and a contention period, may determine that the LBT procedure is successful, and may accordingly begin transmitting a reservation signal.

However, in the illustrated example scenario of FIG. 16, the reservation signal may be transmitted in a discontinous manner (e.g., using discontinuous transmission or DTX), such that 18 μs on-durations in which the reservation signal is transmitted alternate with 9 μs off-durations in which the reservation signal is not transmitted. Note that other values for the on-duration lengths and/or for the off-duration lengths may be used, if desired, though it may be desirable to select on-duration and off-duration lengths that can sustain holding the channel until the next LTE transmission.

The off-durations (e.g., one, some, or all of them) may be used to perform carrier sensing, e.g., to sense whether there is a (e.g., Wi-Fi or other) collision on the medium. If the cellular base station does detect energy (e.g., above a certain energy threshold) during any of the off-durations, the cellular base station may wait at least until no energy is detected (or possibly until energy below the energy threshold is detected) during an off-duration before transmitting an LTE signal. For example, the cellular base station may choose to transmit its LTE signal at the next LTE slot boundary after determining that the medium is available.

Thus, using such an approach to transmitting the reservation signal, the cellular base station may be able to reduce the likelihood of transmitting LTE signals while Wi-Fi (or other interfering) signals are being transmitted on an unlicensed frequency channel. Additionally, it should be noted that using such a discontinuous transmission approach to transmitting the reservation signal may reduce the possible interference caused by the reservation signal to any Wi-Fi (or other) signals being transmitted on the medium, e.g., because such interference may be minimal at least during the off-duration portions of the reservation signal.

In the following further exemplary embodiments are provided.

One set of embodiments may include an apparatus, comprising a processor configured to cause a cellular base station to: perform a listen-before-talk (LBT) procedure on an unlicensed frequency channel; determine that the LBT procedure on the unlicensed frequency channel is successful; transmit a reservation signal on the unlicensed frequency channel based at least in part on determining that the LBT procedure is successful; perform cellular communication on the unlicensed frequency channel after transmitting the reservation signal; and perform carrier sensing on the unlicensed frequency channel at least once after determining that the LBT procedure is successful and before performing cellular communication on the unlicensed frequency channel.

According to some embodiments, the processor is further configured to cause the cellular base station to: transmit the reservation signal in a discontinuous manner including alternating on-duration portions and off-duration portions, wherein carrier sensing on the unlicensed frequency channel is performed during the off-duration portions.

According to some embodiments, the on-duration portions each have a duration of at least one Wi-Fi slot.

According to some embodiments, the off-duration portions each have a duration of at most one Wi-Fi slot.

According to some embodiments, the reservation signal is transmitted for a duration extending from determining that the LBT procedure on the unlicensed frequency channel is successful until performing the cellular communication on the unlicensed frequency channel, with at least one scheduled off-duration that is sufficiently short to avoid allowing access to the unlicensed frequency channel by other wireless devices performing a LBT procedure on the unlicensed frequency channel.

According to some embodiments, the processor is further configured to cause the cellular base station to: perform the carrier sensing during the at least one scheduled off-duration of the reservation signal.

According to some embodiments, the processor is further configured to cause the cellular base station to: select a time at which to perform the cellular communication on the unlicensed frequency channel based at least in part on the carrier sensing performed after determining that the LBT procedure is successful and before performing cellular communication on the unlicensed frequency channel.

According to some embodiments, to select the time at which to perform the cellular communication, the processor is further configured to cause the cellular base station to: determine whether there is an interfering transmission on the unlicensed frequency channel based at least in part on the carrier sensing performed after determining that the LBT procedure is successful and before performing cellular communication on the unlicensed frequency channel; and select a next cellular slot boundary after there is no interfering transmission on the unlicensed frequency channel at which to perform the cellular communication on the unlicensed frequency channel.

Another set of embodiments may include a cellular base station, comprising: an antenna; a radio operably coupled to the antenna; and a processor operably coupled to the radio; wherein the cellular base station is configured to: perform a listen-before-talk (LBT) procedure on an unlicensed frequency channel; transmit a reservation signal on the unlicensed frequency channel after successfully performing the LBT procedure; perform carrier sensing on the unlicensed frequency channel at least once during a duration of the reservation signal; and perform cellular communication on the unlicensed frequency channel after the duration of the reservation signal.

According to some embodiments, the reservation signal is transmitted in a discontinuous manner including alternating on-duration portions and off-duration portions, wherein the carrier sensing is performed during the off-duration portions of the reservation signal.

According to some embodiments, the on-duration portions each have a duration of at least one Wi-Fi slot, wherein the off-duration portions each have a duration of at most one Wi-Fi slot.

According to some embodiments, the cellular base station is further configured to: detect energy above an energy threshold on the unlicensed frequency channel based at least in part on the carrier sensing performed during the duration of the reservation signal; and delay performing the cellular communication based at least in part on detecting energy above the energy threshold on the unlicensed frequency channel.

According to some embodiments, the cellular base station is further configured to: extend the duration of the reservation signal based at least in part on detecting energy above the energy threshold on the unlicensed frequency channel.

According to some embodiments, the cellular communication is delayed and the duration of the reservation signal is extended until a next cellular slot boundary after energy below the energy threshold is detected on the unlicensed frequency channel.

Yet another set of embodiments may include a method, comprising: by a cellular base station: performing a listen-before-talk (LBT) procedure on an unlicensed frequency channel; transmitting a reservation signal on the unlicensed frequency channel after successfully performing the LBT procedure, wherein the reservation signal is transmitted discontinuously such that on-duration portions of the reservation signal alternate with off-duration portions in which the reservation signal is not transmitted; and perform cellular communication on the unlicensed frequency channel after transmitting the reservation signal.

According to some embodiments, the method further comprises: performing energy sensing during at least one off-duration portion in which the reservation signal is not transmitted.

According to some embodiments, the method further comprises: detecting energy greater than an energy threshold based at least in part on performing the energy sensing; and extending transmitting the reservation signal and delaying performing the cellular communication on the unlicensed frequency channel based at least in part on detecting energy greater than the energy threshold.

According to some embodiments, the method further comprises: performing energy sensing during each off-duration portion in which the reservation signal is not transmitted.

According to some embodiments, the on-duration portions each have a duration selected to be sufficiently long to block access to the unlicensed frequency channel by wireless devices performing energy sensing on the unlicensed frequency channel, wherein the off-duration portions each have a duration selected to be sufficiently short to avoid allowing access to the unlicensed frequency channel by wireless devices performing energy sensing on the unlicensed frequency channel.

According to some embodiments, the cellular communication includes LTE license assisted access (LAA) communication.

Still another exemplary embodiment may include a method, comprising: by a device: performing any or all parts of the preceding examples.

A further exemplary embodiment may include a device, comprising: an antenna; a radio coupled to the antenna; and a processing element operably coupled to the radio, wherein the device is configured to implement any or all parts of the preceding examples.

Another exemplary embodiment may include an apparatus, comprising a processor configured to implement any or all parts of the preceding examples.

Yet another exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

A yet further exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
at least one processor configured to cause a cellular base station to:
perform a listen-before-talk (LBT) procedure on an unlicensed frequency channel;
determine that the LBT procedure on the unlicensed frequency channel is successful;
transmit a reservation signal on the unlicensed frequency channel based at least in part on determining that the LBT procedure is successful, wherein the reservation signal is transmitted in a discontinuous manner including alternating on-duration portions and off-duration portions, wherein respective off-duration portions between respective transmitted portions of the reservation signal have respective durations of less than one Wi-Fi slot;
perform cellular communication on the unlicensed frequency channel after transmitting the reservation signal; and
perform carrier sensing on the unlicensed frequency channel at least once after determining that the LBT procedure is successful and before performing cellular communication on the unlicensed frequency channel.

2. The apparatus of claim 1,
wherein respective on-duration portions have respective durations of one Wi-Fi slot.

3. The apparatus of claim 1,
wherein the reservation signal is transmitted for a duration extending from determining that the LBT procedure on the unlicensed frequency channel is successful until performing the cellular communication on the unlicensed frequency channel, with at least one scheduled off-duration portion of the off-duration portions that is sufficiently short to avoid allowing access to the unlicensed frequency channel by other wireless devices performing a LBT procedure on the unlicensed frequency channel.

4. The apparatus of claim 3, wherein the at least one processor is further configured to cause the cellular base station to:
perform the carrier sensing during the at least one scheduled off-duration of the reservation signal.

5. The apparatus of claim 1, wherein the at least one processor is further configured to cause the cellular base station to:
  select a time at which to perform the cellular communication on the unlicensed frequency channel based at least in part on the carrier sensing performed after determining that the LBT procedure is successful and before performing cellular communication on the unlicensed frequency channel.

6. The apparatus of claim 5, wherein to select the time at which to perform the cellular communication, the at least one processor is further configured to cause the cellular base station to:
  determine whether there is an interfering transmission on the unlicensed frequency channel based at least in part on the carrier sensing performed after determining that the LBT procedure is successful and before performing cellular communication on the unlicensed frequency channel; and
  select a next cellular slot boundary after there is no interfering transmission on the unlicensed frequency channel at which to perform the cellular communication on the unlicensed frequency channel.

7. A cellular base station, comprising:
  an antenna;
  a radio operably coupled to the antenna; and
  a processor operably coupled to the radio;
  wherein the processor, the radio, and the antenna are configured to cause the cellular base station to:
    perform a listen-before-talk (LBT) procedure on an unlicensed frequency channel;
    transmit a reservation signal on the unlicensed frequency channel after successfully performing the LBT procedure, wherein the reservation signal is transmitted discontinuously such that on-duration portions of the reservation signal alternate with off-duration portions in which the reservation signal is not transmitted, wherein a duration of the reservation signal comprises the on-duration portions and off-duration portions, and wherein respective off-duration portions between respective transmitted portions of the reservation signal have respective durations of less than nine microseconds;
    perform carrier sensing on the unlicensed frequency channel at least once during the duration of the reservation signal; and
    perform cellular communication on the unlicensed frequency channel after the duration of the reservation signal.

8. The cellular base station of claim 7,
  wherein respective on-duration portions have respective durations of one Wi-Fi slot.

9. The cellular base station of claim 7, wherein the cellular base station is further configured to:
  detect energy above an energy threshold on the unlicensed frequency channel based at least in part on the carrier sensing performed during the duration of the reservation signal; and
  delay performing the cellular communication based at least in part on detecting energy above the energy threshold on the unlicensed frequency channel.

10. The cellular base station of claim 9, wherein the cellular base station is further configured to:
  extend the duration of the reservation signal based at least in part on detecting energy above the energy threshold on the unlicensed frequency channel.

11. The cellular base station of claim 10,
  wherein the cellular communication is delayed and the duration of the reservation signal is extended until a next cellular slot boundary after energy below the energy threshold is detected on the unlicensed frequency channel.

12. A method, comprising:
  by a cellular base station:
    performing a listen-before-talk (LBT) procedure on an unlicensed frequency channel;
    transmitting a reservation signal on the unlicensed frequency channel after successfully performing the LBT procedure, wherein the reservation signal is transmitted discontinuously such that on-duration portions of the reservation signal alternate with off-duration portions in which the reservation signal is not transmitted, and wherein respective off-duration portions between respective transmitted portions of the reservation signal have respective durations of less than one Wi-Fi slot; and
  perform cellular communication on the unlicensed frequency channel after transmitting the reservation signal.

13. The method of claim 12, wherein the method further comprises:
  performing energy sensing during at least one off-duration portion in which the reservation signal is not transmitted.

14. The method of claim 13, wherein the method further comprises:
  detecting energy greater than an energy threshold based at least in part on performing the energy sensing; and
  extending transmitting the reservation signal and delaying performing the cellular communication on the unlicensed frequency channel based at least in part on detecting energy greater than the energy threshold.

15. The method of claim 12, wherein the method further comprises:
  performing energy sensing during respective off-duration portions in which the reservation signal is not transmitted.

16. The method of claim 12,
  wherein respective on-duration portions have respective durations selected to be sufficiently long to block access to the unlicensed frequency channel by wireless devices performing energy sensing on the unlicensed frequency channel,
  wherein respective off-duration portions have respective durations selected to be sufficiently short to avoid allowing access to the unlicensed frequency channel by wireless devices performing energy sensing on the unlicensed frequency channel.

17. The method of claim 12,
  wherein the cellular communication includes LTE license assisted access (LAA) communication.

18. The method of claim 12, wherein respective on-duration portions have respective durations of at least one Wi-Fi slot.

19. The method of claim 12, wherein the reservation signal is transmitted for a duration extending from determining that the LBT procedure on the unlicensed frequency channel is successful until performing the cellular communication on the unlicensed frequency channel, with at least one scheduled off-duration portion of the respective off-duration portions that is sufficiently short to avoid allowing access to the unlicensed frequency channel by other wireless devices performing a LBT procedure on the unlicensed frequency channel.

20. The method of claim 12, further comprising:
selecting a time at which to perform the cellular communication on the unlicensed frequency channel based at least in part on carrier sensing performed after determining that the LBT procedure is successful and before performing the cellular communication on the unlicensed frequency channel.

* * * * *